(12) United States Patent
Fujishima

(10) Patent No.: US 7,879,237 B2
(45) Date of Patent: Feb. 1, 2011

(54) METHOD FOR BIOLOGICAL DISPOSAL OF ORGANIC WASTEWATER AND BIOLOGICAL DISPOSAL APPARATUS

(75) Inventor: Shigeki Fujishima, Tokyo (JP)

(73) Assignee: Kurita Water Industries Ltd., Tokyo (JP)

( * ) Notice: Subject to any disclaimer, the term of this patent is extended or adjusted under 35 U.S.C. 154(b) by 630 days.

(21) Appl. No.: 11/910,994

(22) PCT Filed: Apr. 7, 2006

(86) PCT No.: PCT/JP2006/307440

§ 371 (c)(1),
(2), (4) Date: Feb. 27, 2008

(87) PCT Pub. No.: WO2006/109715

PCT Pub. Date: Oct. 19, 2006

(65) Prior Publication Data

US 2009/0277832 A1     Nov. 12, 2009

(30) Foreign Application Priority Data

Apr. 12, 2005    (JP) .............................. 2005-114326

(51) Int. Cl.
*C02F 3/00* (2006.01)

(52) U.S. Cl. ...................... 210/607; 210/610; 210/624; 210/625; 210/626; 210/195.3; 210/197

(58) Field of Classification Search ................ 210/607, 210/610, 624–626, 195.3, 197
See application file for complete search history.

(56) References Cited

U.S. PATENT DOCUMENTS

2007/0102356 A1*   5/2007   Bailey et al. ................ 210/624

FOREIGN PATENT DOCUMENTS

| JP | S55-020649 A | 2/1980 |
|---|---|---|
| JP | S57-074082 | 5/1982 |
| JP | H08-039092 A | 2/1996 |
| JP | 2000-051886 A | 2/2000 |
| JP | 2000-210692 A | 8/2000 |
| JP | 2001-239295 A | 9/2001 |
| JP | 3360076 B | 12/2002 |
| WO | WO 2003/076345 A | 9/2003 |

* cited by examiner

*Primary Examiner*—Chester T Barry
(74) *Attorney, Agent, or Firm*—The Marbury Law Group PLLC

(57) ABSTRACT

A biological treatment method and device for organic wastewater, whereby the amount of minute organisms which reduce the amount of excess sludge and held within an activated sludge tank can be stabilized so that the treatment can be stabilized, are provided. Substrates for growing dispersed bacteria and/or dispersed bacteria are supplied to a sludge treatment tank 51 which reduces the sludge by the minute organisms, so that the minute organisms grow stably and reduce the sludge. Specifically, a first and a second biological treatment step are conducted respectively in a first activated sludge tank 21 and a second biological treatment tank 31. The sludge included in effluent which flows from the biological steps is separated in a sedimentation tank 41. The generated sludge obtained is supplied to the sludge treatment tank 51. The water to be treated which is bypassed via a bypass path 26 is introduced to a sludge treatment tank 51 as substrates to be assimilated by bacteria so that dispersed bacteria are made to grow in the sludge treatment tank 51 and the minute organisms are held stably in the sludge treatment tank 51 to promote the reduction of sludge.

20 Claims, 4 Drawing Sheets

METHOD FOR BIOLOGICAL DISPOSAL OF ORGANIC WASTEWATER AND BIOLOGICAL DISPOSAL APPARATUS

TECHNICAL FIELD

The present invention relates to a biological treatment method of organic wastewater and a device which treats organic wastewater by an activated sludge and, in particular, relates to a biological treatment method and device which can reduce the amount of excess sludge which is produced by the biological treatment of organic wastewater.

BACKGROUND ART

The activated sludge process is widely used as a treatment method of various types of organic wastewater such as sewage and industrial wastewater, even among biological treatment methods which biologically treat organic wastewater including organic substance because of good quality of treated water and its advantage of easy maintenance. However, the volume loading of BOD (organic substance expressed as biochemical oxygen demand) upon an activated sludge tank which conducts an activated sludge treatment is about 0.5 to 0.8 kg/m$^3$/day. As a result, in order to operate at a high load, there is a problem in that it becomes necessary to enlarge the activated sludge tank and a wide setting area is necessary. In addition, most of the BOD which is assimilated by bacteria which forms the activated sludge is used as a respiratory substrate for bacteria and is decomposed into carbon dioxide and water, and one part is used for propagating bacteria, specifically, about 20 to 40% of the BOD which is absorbed by the bacteria is used for bacterial growth. That is, because around 20 to 50% of the BOD which is absorbed by activated sludge is transformed into bacteria, treatment of organic wastewater by the activated sludge has a problem where the bacteria which are grown using the BOD as their substrates are ejected as excess sludge.

Consequently, a fluid bed method in which supports are added to an activated sludge tank is known. According to the fluid bed method, because bacteria are retained on the supports, the concentration of bacteria within the activated sludge tank is increased and high loading treatment where the volume loading of BOD is about 3 kg/m$^3$/day becomes possible. However, under the fluid bed method, the amount of excess sludge is more than the usual activated sludge method, more specifically, about 30% of the BOD biologically decomposed will be changed to excess sludge.

As a result of this, a biological treatment method of organic wastewater which establishes a secondary treatment tank which preserves sessile protozoa as a latter step of a primary treatment tank (activated sludge tank) is known (for example, patent document 1). According to the method disclosed in the patent document 1, by applying a high BOD loading to the primary treatment tank, the growth of sessile protozoa is suppressed and the aggregation of bacteria is prevented. Activated sludge treated water which includes dispersed bacteria and flows out from the primary treatment tank is introduced to the secondary treatment tank. Because sessile protozoa which prey on dispersed bacteria are preserved in the secondary treatment tank, dispersed bacteria are preyed upon by the sessile protozoa and excess sludge is reduced and the biologic community is aggregated. Therefore, aggregations of microorganisms (sludge) which have good sedimentation properties are formed in the secondary treatment tank and the effluent discharged from the secondary treatment tank is separated into a solid and liquid and clear treated water is obtained.

In this way, by combining the activated sludge tank operated at a high load with a minute organism preserving tank which preserves sessile protozoa, it is possible to reduce the amount of excess sludge at a high load, and more, to obtain clear treated water. As a result, various refinement methods concerning the activated sludge process which uses an activated sludge tank and a minute organism preserving tank are proposed. For example, in patent document 2, a biological treatment device is arranged with a bait breaking down tank between the activated sludge tank and the minute organism preserving tank. In the device disclosed in patent document 2, the flocculated bacteria are dispersed by performing ultrasonic treatment etc. in the bait breaking down tank so that they are easily consumed by the protozoa which are preserved in a latter tank, that is the minute organism preserving tank.

[Patent document 1] Japanese Laid-Open Patent Publication No. S55-20649

[Patent document 2] Japanese Laid-Open Patent Publication No. S57-74082

DISCLOSURE OF THE INVENTION

Problems to be Solved

According to the conventional technology stated above, in order that a fixed amount of minute organisms may be preserved within the minute organism preserving tank, the bacteria which are supplied to the minute organism preserving tank are dispersed so that minute organisms can easily consume the bacteria to grow. As a result, according to the conventional technology stated above, a reduction in the amount of excess sludge is not always sufficient. Alternatively, when the bacteria which are supplied to the minute organism preserving tank are flocculated to become larger than the mouths of the minute organisms, it becomes difficult for the minute organisms to prey on bacteria. As a result, bait for growing the minute organisms will be deficient and the minute organisms will decrease and it is no longer possible to sustain them at a fixed amount within the minute organism preserving tank.

The purpose of the present invention is to propose a biological treatment method and device for treating organic wastewater which stably preserves minute organisms at a fixed level in a minute organism preserving tank and which can stably reduce the amount of excess sludge produced.

Means for Solving the Problems

In the present invention, a given amount of dispersed bacteria are made to exist in a tank which preserves minute organisms by supplying either substrate for bacteria or dispersed bacteria or both to the tank in order to cause a growth of minute organisms by securing bait for minute organisms. And a reduction in the amount of excess sludge is accelerated by the grown minute organisms. More specifically, the present invention is proposed below.

(1) A biological treatment method of organic wastewater for biologically treating organic wastewater which includes organic substances and is introduced to a biological treatment tank and separating effluent discharged from said biological treatment tank into sludge and treated water comprising:

a biological treatment step for converting said organic substances in said organic wastewater as substrates into bacteria in said biological treatment tank;

a sludge reduction step for reducing sludge by introducing generated sludge which includes said bacteria into a sludge treatment tank to be consumed by minute organisms; and an operation for adding substrates to be assimilated by said bacteria and/or dispersed bacteria generated by using said organic substances as substrates to said sludge treatment tank of said reduction step.

(2) The biological treatment method of organic wastewater according to (1), wherein said biological treatment step includes a first biological treatment step wherein organic wastewater including organic substances is introduced to a first biological treatment tank and biologically treated for generating dispersed bacteria by using said organic substances as substrates, and a second biological treatment step wherein effluent which is discharged from said first biological treatment step and includes said dispersed bacteria is introduced to a second biological treatment tank for making said minute organisms consume said dispersed bacteria and generating bacteria by using a part of said organic substances which remain without being treated in said first biological treatment step;

said sludge reduction step is a process for reducing sludge by introducing generated sludge generated in said second biological treatment step into said sludge treatment tank to be consumed by said minute organisms; and wherein substrates to be assimilated by dispersed bacteria and/or dispersed bacteria generated in said first biological treatment tank are added to said sludge treatment tank.

(3) The biological treatment method of organic wastewater according to (1), further comprising a dispersed bacteria generating step for generating dispersed bacteria by introducing a part of organic wastewater to be introduced to said biological treatment step and/or substrates to be assimilated by bacteria to a dispersed bacteria growing tank which is arranged parallel to said biological treatment tank; wherein said sludge reduction step is a process for reducing sludge by introducing a part or all of generated sludge generated in said biological treatment step into said sludge treatment tank to be consumed by said minute organisms; and wherein dispersed bacteria generated in said dispersed bacteria growing tank are added to said sludge treatment tank.

(4) The biological treatment method of organic wastewater according to (1) or (2), wherein a part of said organic wastewater is made to bypass said biological treatment step and is introduced to said sludge treatment tank of said sludge reduction step.

(5) The biological treatment method of organic wastewater according to any one of (1) to (4), wherein a nutritional supplement for said minute organisms is further added to said sludge treatment tank of said sludge reduction step.

(6) The biological treatment method of organic wastewater according to any one of (1) to (5), wherein a mean retention time of sludge which is held within said sludge treatment tank of said sludge reduction step is set to be between 2 to 30 days.

(7) A biological treatment device of organic wastewater comprising:

a biological treatment tank to which organic wastewater including organic substances is introduced and which biologically treats said organic wastewater to generate bacteria using said organic substances as substrates;

a solid liquid separating device which separates effluent discharged from said biological treatment tank into treated water and sludge;

a sludge treatment tank which holds minute organisms and into which said sludge is introduced to be consumed by said minute organisms; and an adding device for adding substrates to be assimilated by said bacteria and/or dispersed bacteria generated by using said organic substances as substrates to said sludge treatment tank.

The biological treatment tank may be an anaerobic biological treatment tank wherein organic substances are biologically decomposed under an anaerobic condition, or it may be an aerobic biological treatment tank wherein organic substances are biologically decomposed under an aerobic condition. However, since anaerobic bacteria which anaerobically decompose organic substances grow slowly, it is preferable to use an aerobic biological treatment tank in order to obtain high reaction velocity.

As a system of the biological treatment for the biological treatment step, any systems such as a floated system and a fluid system may be adopted. Specifically as a floated system, an activated sludge method which has a sedimentation tank arranged in the latter of a biological treatment tank, a membrane activated sludge method which filters suspended sludge by a membrane for solid liquid separation etc. are mentioned. A system where sludge separated in the sedimentation tank is returned to the biological treatment tank as return sludge is a kind of the activated sludge method which has a sedimentation tank arranged in the latter of the biological treatment tank.

Various loading matters may be added as supports for holding bacteria in the fluid biological treatment system. Materials of the supports are not limited, then, inorganic materials, such as ashes, sand, activated carbon and ceramics, and organic materials such as a synthetic resin and cellulose (the derivative of cellulose is included) etc may be used. Polyurethane, polyethylene, polypropylene, polystyrene, and polyvinyl alcohol, etc. can be cited as the synthetic resin, and a foaming object which is formed by mixing these synthetic resins and foaming agent etc. and foaming the mixture is porous with net structure, therefore, it is preferably used. Supports made from a gel-like material may be used as well.

The shape of the supports is not limited, granular, tube, honeycomb, filamentous, and wave shape, etc. can be illustrated. A sphere, a pellet, a rectangle, etc. can be illustrated as the granular shape of the support. The preferable size of the supports is about 0.1 to 10 mm. The preferable filling rate of the supports at bulk volume is 1 to 20% per biological treatment tank.

When an activated sludge method is used in the biological treatment step, operating conditions of the biological treatment tank may be based on standard activated sludge methods, however, they can be adjusted depending on methods such as a fluid bed method, multi stepped activated sludge method, and membrane activated sludge method etc. HRT (Hydraulic retention time) refers to time from when treated water flows into a biological treatment tank until it flows out, and it is calculated by dividing a flux (L/hour) of the water to be treated by the volume of a biological treatment tank. SRT (Sludge retention time) can be obtained by formula 1.

SRT=Amount of sludge held in a tank/Amount of sludge discharged from a tank [Formula 1]

Here, the amount of sludge in a tank is a biomass of microbes (sludge) in a biological treatment tank and is obtained by formula 2. The amount of sludge discharged from a tank is an amount of microbes (sludge) discharged from the biological treatment tank and is obtained by formula 3.

Amount of sludge held in a tank=Concentration of suspended solid(SS)(mg/L)×Volume of the tank (L) [Formula 2]

Amount of sludge discharged from a tank=Concentration of suspended solid(SS)(mg/L)×Amount of sludge fluid discharged from a tank(L/day)  [Formula 3]

Bacteria which are grown by using organic substances included in organic wastewater as substrates are contained in the effluent which flows from the biological treatment step. The effluent is treated in a solid liquid separation step or the like, and generated sludge which is composed of aggregated, flocculated bacteria is obtained. In the present invention, this generated sludge is introduced to the sludge treatment tank and substrates to be assimilated by bacteria and/or dispersed bacteria which are generated by assimilating organic substances are added to the sludge treatment tank, so that dispersed bacteria on which minute organisms easily prey are maintained at a given amount. Therefore, necessary bait for growing minute organisms is secured, decrease of the minute organisms in the sludge treatment tank can be prevented and stable effect of sludge reduction can be obtained.

It is preferable that dispersed bacteria are added to the sludge treatment tank at an amount necessary for growing a given amount of minute organisms. Instead of the dispersed bacteria, substances which are assimilated by bacteria may be added to the sludge treatment tank in order to grow a given amount of dispersed bacteria in the sludge treatment tank. Organic substances contained in an organic wastewater which is the water to be treated in the biological treatment step, residual organic substances remained in the effluent which flows from the biological treatment step, and other additives may be used as the substrates. Furthermore, both the substrates and the dispersed sludge may be added to the sludge treatment tank.

The additive amount of the substrates and/or the dispersed bacteria is preferably set to be an amount necessary for generating enough dispersed bacteria to grow a given amount of minute organisms in the sludge treatment tank. Specifically, it is preferable that the additive amount of the substrates be 0.1 weight % or more of the amount of COD (organic substance expressed as chemical oxygen demand) of the sludge which is supplied to the sludge treatment tank, or more particularly between 5 weight % and 20 weight %.

In this specification, the "generated sludge" means various sludge generated in biological treatment tank(s) of the biological treatment step arranged anterior to the sludge treatment tank.

According to an aspect of the present invention described in (2), the biological treatment step is divided into a first biological treatment step and a second biological treatment step. A biological treatment for growing dispersed bacteria is performed in the first biological treatment step and then, minute organisms are led naturally to prey on the dispersed bacteria in the second biological treatment step. Thereby, sludge reduction is realized even more efficiently.

In the second biological treatment step, the dispersed bacteria are preyed on by the minute organisms, and flocculated sludge containing bacteria and minute organisms is generated.

In the aspect of the invention described in (2), generated sludge obtained in the second biological treatment step is discharged directly from the second biological treatment tank, or is solid liquid separated by a solid liquid separator arranged in the latter of the second biological treatment tank, and then is introduced to the sludge treatment tank of the latter sludge reduction step. Further, biological treatment where organic substances remained in the effluent which flows from the first biological treatment step are decomposed by bacteria is driven in the second biological treatment step. Therefore, the excess sludge can be stably and sufficiently decreased, and good quality treated water is also realized by the aspect of the invention described in (2).

Other than the dispersed bacteria themselves and the substrates for growing dispersed bacteria which are added to the sludge treatment tank, a substance which is taken by minute organisms as a nutritional supplement may also be added to the sludge treatment tank as described in (5). A substance containing lipid is particularly preferable as the nutritional supplement. As lipid, phospholipid, a free fatty acid, and sterol, etc. are exemplified and a substance containing phospholipid, such as lysophospholipid and lecithin, can be preferably used. Specifically, rice bran, strained lees of beer, strained lees of oil, pomace of beet, shell powder, an egg shell, a vegetable extract, a fish meat extract, various amino acid, various vitamins, etc. can be used as the nutritional supplement.

In order to prevent an outflow of minute organisms, the sludge retention time of the sludge treatment tank is preferably set longer, specifically 2 to 30 days as described in (6).

When a rather small sludge treatment tank is adopted, a sedimentation tank may be arranged in the latter of the sludge treatment tank so that sludge can be returned in order to secure the retention time. Moreover, only a solid can be retained in the sludge treatment tank by solid liquid separation using a dehydrator or a membrane. In the case of using a membrane, a submerged membrane may be arranged in the sludge treatment tank for example.

According to the present invention, substrates to be assimilated by bacteria and/or dispersed bacteria are added to the sludge treatment tank holding minute organisms such as protozoa or the like, so that a decrease of minute organisms can be prevented and a high efficiency of reducing excess sludge and stable treatment can be realized.

EMBODIMENT FOR CARRYING OUT THE INVENTION

Figure 1:
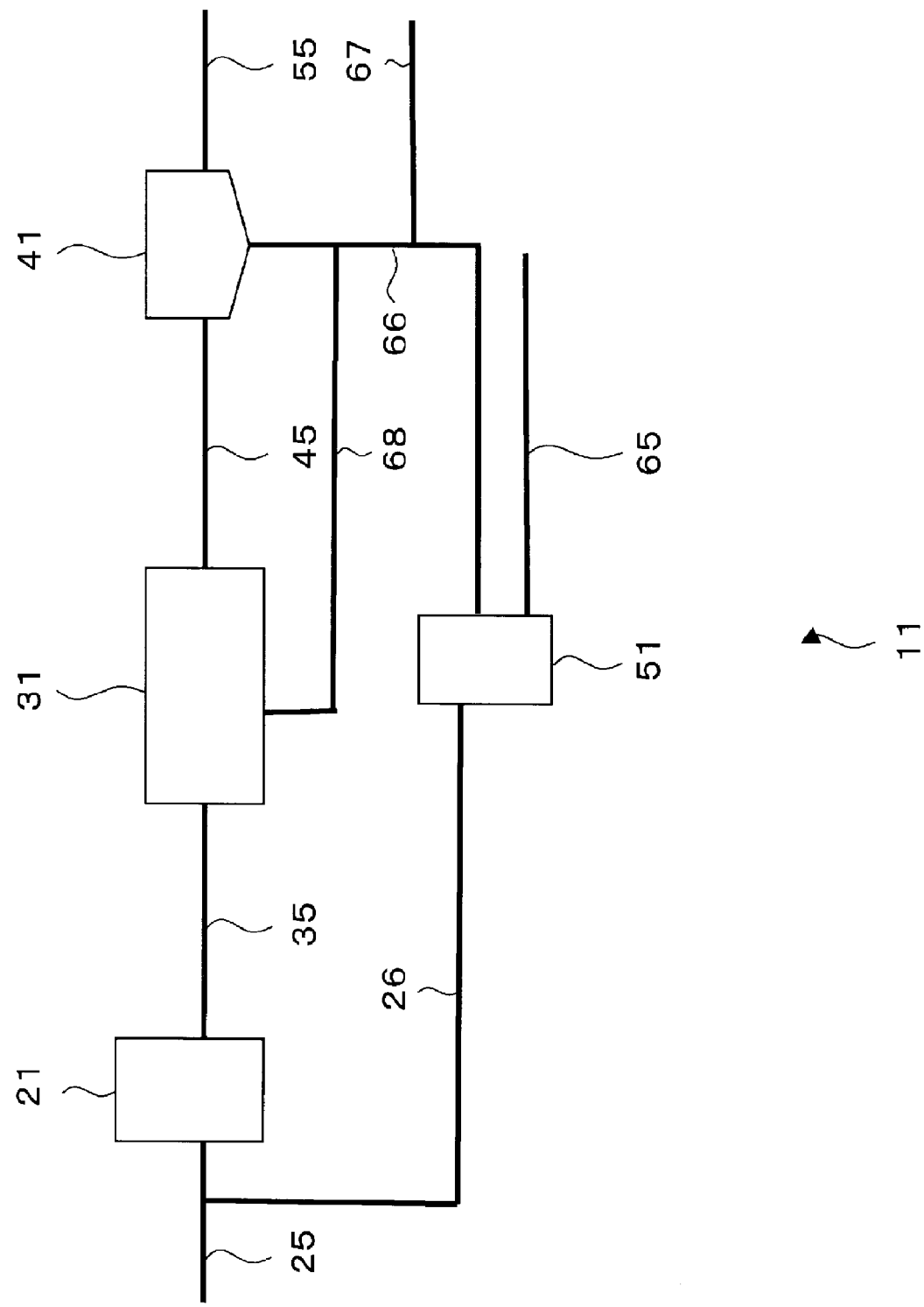
FIG. 1 is a model drawing of a biological treatment device relating to a first embodiment of the present invention.

Below, the present invention will be explained in detail using drawings. Below, since the same symbols are used for the same parts, their explanation is omitted or simplified. FIG. 1 is a model drawing of a biological treatment device 11 (Herein referred to simply as "treatment device") for treating organic wastewater relating to a first embodiment of the present invention. The treatment device 11 is arranged with a first activated sludge tank 21 and a second activated sludge tank 31 as biological treatment tanks, a sedimentation tank 41 used as a solid liquid separating device and a sludge treatment tank 51. The first activated sludge tank 21 and the second activated sludge tank 31 are connected by a first connecting tube 35, the second activated sludge tank 31 and the sedimentation tank 41 are connected by a second connecting tube 45, and the sedimentation tank 41 and the sludge treatment tank 51 are connected by a sludge pipe 66, respectively in series.

In addition, a raw water pipe 25 is connected to the entrance side of the first activated sludge tank 21. A bypass path 26 as an adding device is diverged from this raw water pipe 25 and the end of the bypass path 26 is connected to the sludge treatment tank 51. A first sludge discharging pipe 67 and a return sludge pipe 68 are connected to the sludge pipe 66 and the end of the return sludge pipe 68 is connected to the second activated sludge tank 31. Instead of the bypass path 26, a pipe for supplying another organic wastewater or the like which is different from the raw water can be connected to the sludge treatment tank 51 as the adding device.

Next, a treatment method of organic wastewater which uses this treatment device 11 will be explained. First, organic wastewater such as sewage or industrial wastewater is introduced as water to be treated to the first activated sludge tank 21 from the raw water pipe 25. Then, the activated sludge which is held in the first activated sludge tank 21 is mixed with the organic wastewater and a first biological treatment step (activated sludge treatment) which biologically decomposes the organic substances included in the organic wastewater is driven. Because the treatment device 11 is arranged with the second activated sludge tank 31, the first activated sludge tank 21 is operated at a high load under an aerobic condition wherein an oxygen containing gas such as air is supplied from a gas supply device (not shown in the drawings) such as an aeration tube or an ejector. Preferably, the first activated sludge tank 21 is operated under conditions where pH is 6 to 8, volume loading of BOD is 1 kg/m$^3$/day or more, and HRT is 24 hours or less.

By the first biological treatment step, most (more than 70% in the present embodiment) of the organic substances which are included in the organic wastewater which is introduced as water to be treated, is biologically absorbed. According to the present embodiment, because the first activated sludge tank 21 is small and is operated at a high load, bacteria which assimilate the organic substances to grow are not flocculated but dispersed and discharged from the first activated sludge tank 21 being included in the effluent. This effluent is introduced to the second activated sludge tank 31 via the first connecting tube 35 and the second biological treatment step (activated sludge treatment) is carried out.

Minute organisms such as vorticella or rotifer exist in the second activated sludge tank 31 and it is operated under an aerobic condition by supplying an oxygen containing gas from a gas supply device (not shown in the drawings) where pH is preferably 6 to 8, and sludge loading of BOD is preferably 0.1 kg/kg-MLSS/day or less. In order to grow minute organisms which grow slowly, the second activated sludge tank 31 is operated at a low load so that SRT is 40 days or less and preferably 30 days or less, and more preferably within a fixed range of about 10 to 30 days. It is preferred that a part of the solids separated from the liquid part in the sedimentation tank 41 of the latter step are circulated back to the second activated sludge tank 31 as return sludge. Alternatively, a separation membrane may be arranged in the second activated sludge tank 31 so that the second activated sludge tank 31 is operated by a membrane separation method and holds the sludge within the tank. Also, supports can be added to the second activated sludge tank 31 and it can be driven by supporting the minute organisms and bacteria on a fixed bed or fluidized bed. Further, it is preferable that excessively grown minute organisms or its feces etc. is removed by replacing the activated sludge held in the second activated sludge tank 31 once in 40 days and particularly 30 days.

The residual organic substances which are included in the discharged effluent from the first activated sludge tank 21 are biologically decomposed in this second activated sludge tank 31 and the dispersed bacteria is reduced by consumption by the minute organisms or self digestion. The SRT of the second activated sludge tank 31 is long and the minute organisms exist in the second activated sludge tank 31, so that the bacteria within the second activated sludge tank 31 are flocculated and a mixed sludge which is flocculated and is a kind of the generated sludge with also the minute organisms, is generated.

According to the present embodiment, the liquid which includes this generated sludge is discharged from the second activated sludge tank 31 and introduced through the second connecting tube 45 to the sedimentation tank 41 where the generated sludge is separated from the treated water. The treated water is extracted from a treated water pipe 55 which is connected to the exit side of the sedimentation tank 41 and at least one part of the generated sludge is sent to the sludge treatment tank 51 thorough the sludge pipe 66. According to the present embodiment, biological decomposition is driven also in the second activated sludge tank 31, then, it is possible to obtain treated water with excellent quality.

Further, in a case where a connecting tube which connects the second activated sludge tank 31 and the sludge treatment tank 51 is arranged, generated sludge separated in both the second activated sludge tank 31 and the sedimentation tank 41 can be introduced to the sludge treatment tank 51. In the treatment device 11, one part of the sludge which is separated in the sedimentation tank 41 is circulated to the second activated sludge tank 31 as return sludge via the return sludge pipe 68 diverged from the sludge pipe 66. Also, the sludge can be returned as return sludge to the first activated sludge tank 21 from either the second activated sludge tank 31 or the sedimentation tank 41.

Similar to the second activated sludge tank 31, minute organisms are retained in the sludge treatment tank 51. And the sludge reduction step which reduces generated sludge is carried out while adding organic substances which are contained in the organic wastewater as substrates by introducing the organic wastewater from the bypass path 26. It is preferred that the additive amount of substrates be 0.1 weight % or more of COD amount of the generated sludge which is supplied to the sludge treatment tank 51, or more particularly between 1 weight % and 20 weight %. In the present embodiment, the water to be treated which is made to bypass the biological treatment process is used as a substrate source to be added to the sludge treatment tank 51, however, the liquid (herein referred to as "activated sludge treated water") discharged from the first biological treatment step can also be used. Not only organic substances but also dispersed bacteria are included in the activated sludge treated water as substrates. Also, the dispersed bacteria which are grown by biological treatment can be added as it is or in a concentrated form to the sludge treatment tank 51.

The sludge treatment tank 51 is operated under an aerobic condition by supplying an oxygen containing gas from a gas supply device (not shown in the drawings) where pH is preferably 4 to 8 and SRT is preferably 12 hours or more and particularly between 38 hours and 30 days. When the pH value of the sludge treatment tank is 6 or less, the sludge reduction effects are particularly high.

The SRT of the sludge treatment tank 51 can be adjusted by adjusting for example the rate of return (the amount returned to the second activated sludge tank 31 against the amount supplied to the sludge treatment tank 51) of the generated sludge which has been separated in the sedimentation tank. And in a case where the treatment device 11 is started or the amount of sludge generated in the first activated sludge tank 21 is large, between half and all of the generated sludge can be supplied to the sludge treatment tank 51 or a part of the generated sludge can be discharged from the first sludge discharging pipe 67 as excess sludge.

The sludge which is discharged from the sludge treatment tank 51 (herein referred to as "reduced treatment sludge") can be sent as it is or as solid liquid separated to the second activated sludge tank 31, or it can be discharged from a second sludge discharging pipe 65 which is connected to the sludge treatment tank 51. If the reduced treatment sludge is solid liquid separated and the liquid separated is sent to the first activated sludge tank 21 to be treated by activated sludge, then a further reduction in the sludge and a decrease in the concentration of the COD of the treated water is accelerated. Also, the reduced treatment sludge can also be returned to the sludge treatment tank 51.

A nutritional supplement, which accelerates the growth of minute organisms, other than substrates and/or dispersed bacteria can be added to the sludge treatment tank 61. A substance which includes a lipid can be used as a nutritional supplement and it is preferred that the additive amount be 0.01 mg/L/day per tank volume or more and in particular between 0.1 and 10 mg/L/day.

Two or more biological treatment tubs are arranged for the first activated sludge tank 21 (as a whole), and a multi step treatment can be carried out. Further, supports can be added to the first activated sludge tank 21 and a fluidized bed can be adopted using supports. In this way, a high loading operation where a volume loading of BOD is 5 kg/m$^3$/day or more becomes possible.

The activity of the minute organisms whose speed of growth is slower than bacteria and self digestion of bacteria are utilized in the second activated sludge tank 31. Therefore, it is important to adopt operating conditions or a treatment device so that the minute organisms and the bacteria stay within the system. Because of this it is preferred that the second activated sludge tank 31 is operated by an activated sludge treatment method where sludge is returned or an activated sludge treatment method with membrane separation. In these cases, by adding supports within the aeration tank it is possible to increase the retention amount of the minute organisms within the tank.

Also, by adding supports to the sludge treatment tank 51 it is possible to increase the retention amount of the minute organisms within the tank.

The shape and size of the supports which are added to the first activated sludge tank 21, the second activated sludge tank 31 and the sludge treatment tank 51 can optionally be a sphere shape, a pellet shape, a hollow cylinder shape or filamentous shape and can be between about 0.1 to 10 mm in diameter. Also, materials of the supports can optionally be a natural material, an inorganic material or a polymer material, and a gelatinous material can also be used.

Figure 2:
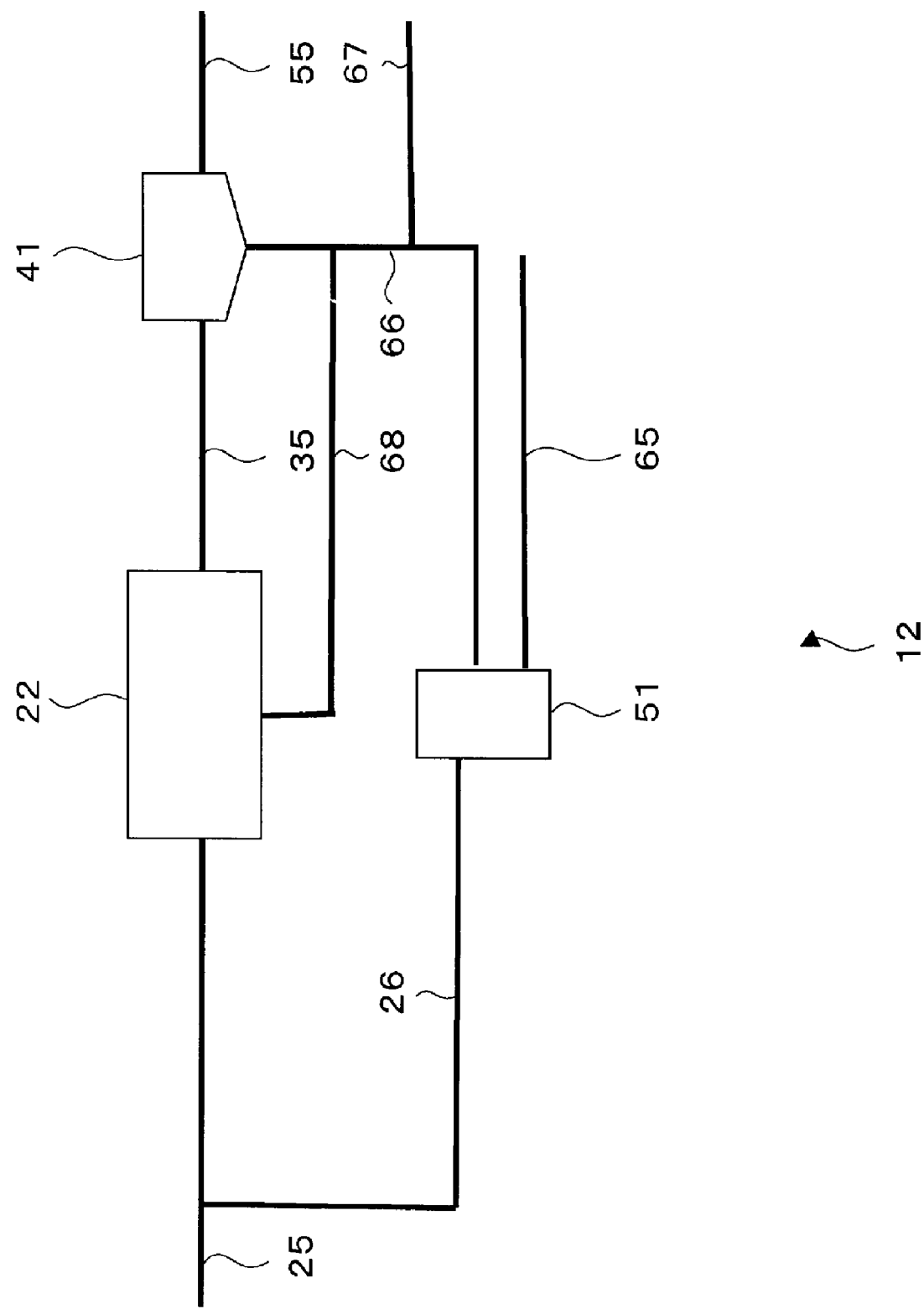
FIG. 2 is a model drawing of a biological treatment device relating to a second embodiment of the present invention.

Next, a treatment device 12 relating to a second embodiment of the present invention will be explained using FIG. 2. FIG. 2 is a model drawing of a treatment device 12. The treatment device 12 is arranged with an activated sludge tank 22 as a biological treatment tank, a sedimentation tank 41 and a sludge treatment tank 51. The activated sludge tank 22 is connected to the sedimentation tank 41 via a first connecting tube 35. That is, the treatment device 12 of the second embodiment is different from the treatment device 11 of the first embodiment in that the first biological treatment tank 21 is not arranged and the return sludge pipe 68 of the treatment device 12 of the second embodiment is connected to the activated sludge tank 22.

The activated sludge tank 22 of this treatment device 12 is larger than the activated sludge tank 21 of the treatment device 11 of the first embodiment. The operating conditions are based on standard activated sludge methods, however, it can be adjusted depending on methods such as a fluid bed method, multi stepped activated sludge method, membrane activated sludge method etc. The bacteria are generated within the activated sludge tank 22 and the generated bacteria are flocculated and enter the sedimentation tank 41 in the flocculated state. In the sedimentation tank 41, flock which has a large specific gravity is separated from the liquid by spontaneous sedimentation, then a generated sludge is obtained and the liquid is extracted from the treated water pipe 55 as treated water.

The generated sludge which has been obtained in the sedimentation tank 41 is supplied to the sludge treatment tank 51 from the sludge pipe 66. According to the present embodiment, a part of the generated sludge is returned to the activated sludge tank 22 via the return sludge pipe 68. In this way, the device structure of the treatment device 12 of the present embodiment is more simplified compared to the treatment device 11 of the first embodiment.

Figure 3:
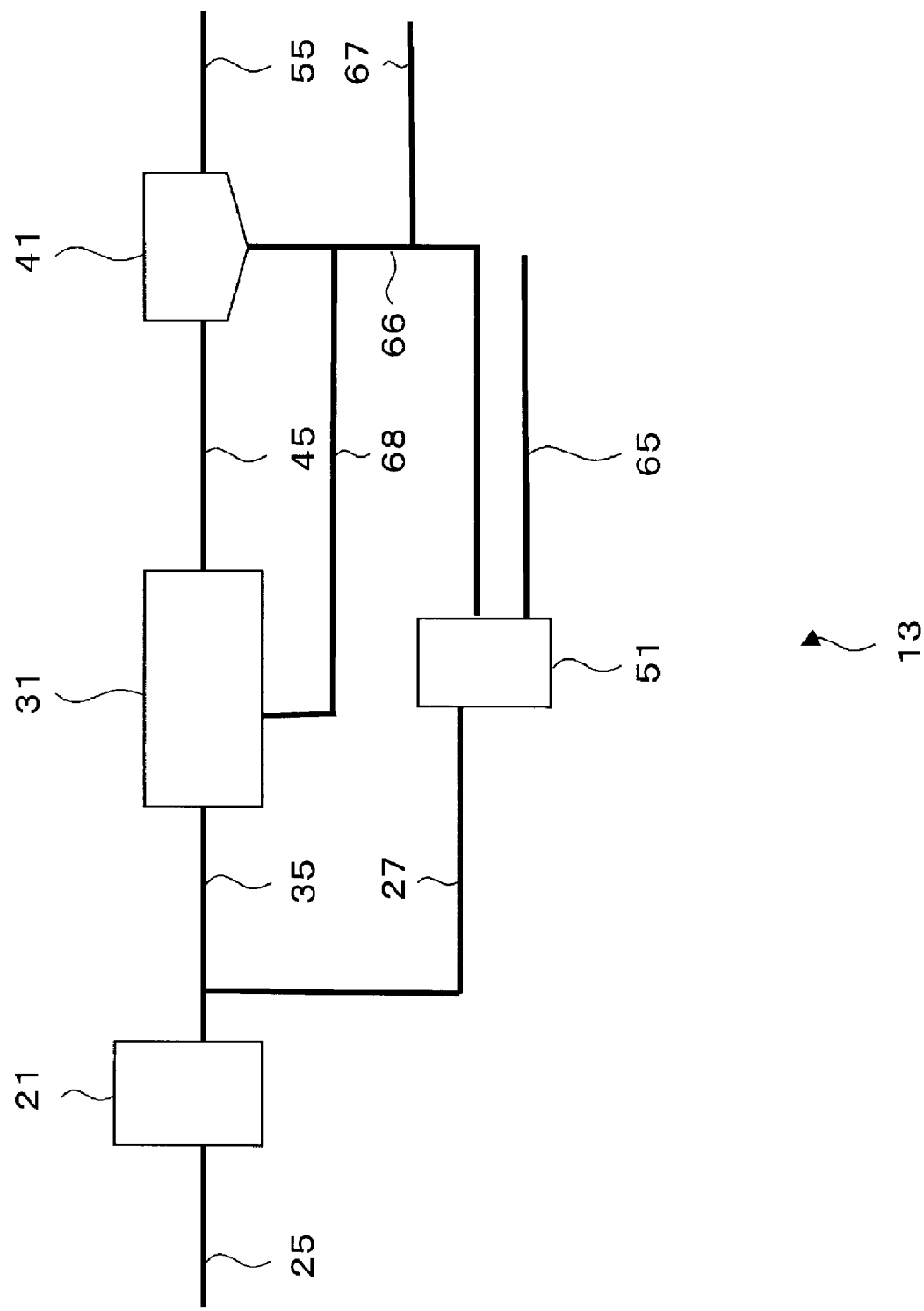
FIG. 3 is a model drawing of a biological treatment device relating to a third embodiment of the present invention.

FIG. 3 is a model drawing of a treatment device 13 relating to a third embodiment of the present invention. The treatment device 13 is the same as the device 11 of the first embodiment being arranged with a first activated sludge tank 21, a second activated sludge tank 31, a sedimentation tank 41 and a sludge treatment tank 51. The structure of the treatment device 13 is almost the same as the treatment device 11. However, the bypass path 26 which has the raw water bypassed in the treatment device 11 of the first embodiment is not arranged in the treatment device 13. Instead, a divergence path 27 is arranged as an adding device. One end of the divergence path 27 is connected to the first connecting tube 35 and the other end is connected to the sludge treatment tank 51. Organic substances which are contained in the effluent discharged from the first activated sludge tank 21 are supplied as substrates to the sludge treatment tank 51.

Figure 4:
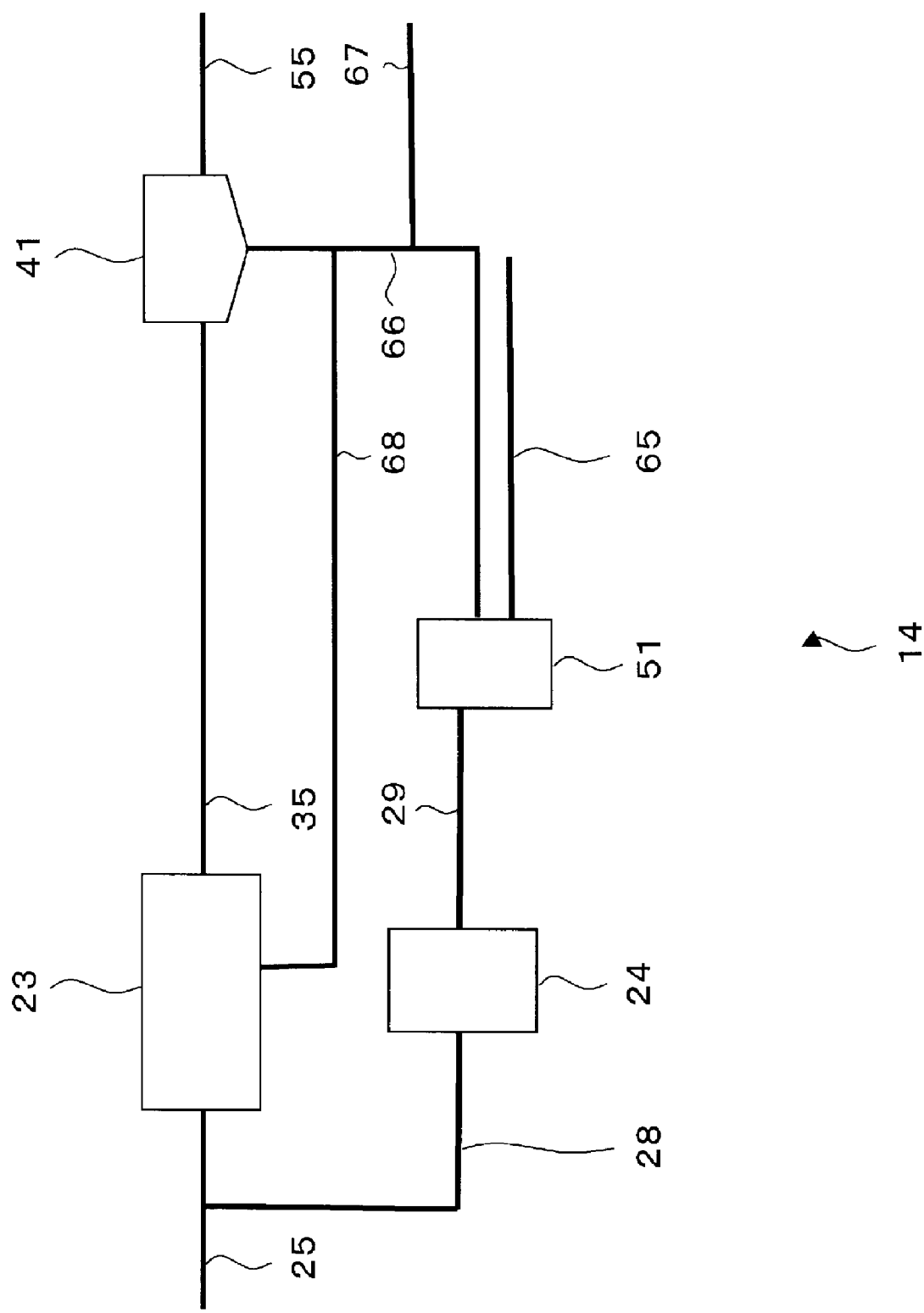
FIG. 4 is a model drawing of a biological treatment device relating to a fourth embodiment of the present invention.

FIG. 4 is a model drawing of a treatment device 14 relating to a fourth embodiment of the present invention which is arranged with an activated sludge tank 23 as a biological treatment tank, a dispersed bacteria growing tank 24, a sedimentation tank 41 and a sludge treatment tank 51. The activated sludge tank 23 is larger than the activated sludge tank 21 of the treatment device 11 of the first embodiment. There are no particular restrictions to the operating conditions and, for example, it is possible to base them on a standard activated sludge method. The bacteria which are grown in the activated sludge tank 23 are introduced into the sedimentation tank 41 in a flocculated state the same as the case in the second embodiment. At least one part of the generated sludge which is solid liquid separated in the sedimentation tank 41 is supplied to the sludge treatment tank 51 though the sludge pipe 66 and the remaining part of the sludge is returned to the activated sludge tank 23 via the return sludge pipe 68.

Alternatively, instead of the bypass path 26 of the treatment device 12 of the second embodiment, a second raw water pipe 28 is connected to the raw water pipe 25 and an end of the second raw water pipe 28 is connected to the entrance side of the dispersed bacteria growing tank 24. The dispersed bacteria growing tank 24 is smaller than the first activated sludge tank 21 of the treatment device 11 of the first embodiment and preferably, is driven under a condition where pH is preferably 6 to 8, a volume loading of BOD is preferably 1 kg/m$^3$/day or more, and SRT is preferably 24 hours or less, so that dispersed bacteria are generated. The dispersed bacteria generated in the dispersed bacteria growing tank 24 are added to the sludge treatment tank 51 via a third connecting tube 29. Here, in the present embodiment the third connecting tube functions as an adding device.

EXAMPLE 1

Below, the present invention will be further explained in detail based on examples. As a first example, the treatment device 11 shown in FIG. 1 is used, and an experiment was conducted on artificial wastewater ($COD_{CT}$ concentration of 1,000 mg/L, BOD concentration of 660 mg/L) as water to be treated. The first activated sludge tank 21 was a volume of 3.6 L and operated without returning sludge. The first activated sludge tank 21 was operated under conditions of pH 6.8, volume loading of BOD of 3.85 kg/m$^3$/day and HRT of 4 hours. The second activated sludge tank 31 was a volume of 15 L and operated under conditions of pH 6.8, a sludge loading of BOD to the sludge within the tank of 0.22 kg/kg-MLSS/day and HRT of 17 hours. In the example 1, the treatment conditions for treating water to be treated as a whole of biological treatment tank which is made up of the first activated sludge tank 21 and the second activated sludge tank 31 were made to be volume loading of BOD of 0.75 kg/m$^3$/day and HRT of 21 hours so that nearly all the organic substances which were included in the water to be treated are biologically decomposed in the first activated sludge tank 21 and the second activated sludge tank 31.

Alternatively, the sludge treatment tank 51 was a volume of 3 L and operated under conditions of pH 5.0, HRT 6 days and SRT 6 days. The sludge (COD concentration of 7,000 mg/L) discharged from the second activated sludge tank 31 was introduced to the sludge treatment tank 51 at 0.5 L/day. In addition, the sludge held in the sludge treatment tank 51 was discharged at 0.5 L/day. The water to be treated bypassed via the bypass path 26 was added to the sludge treatment tank 51 as substrates to be assimilated by bacteria at an additive amount of 10.5 mg/day, the additive amount was measured as COD concentration.

When the water to be treated was treated under the above-mentioned conditions, the sludge divertment rate of BOD which was contained in the water to be treated was 0.12 kg-MLSS/kg-BOD.

EXAMPLE 2

In addition to the construction and conditions of the example 1, lecithin was added once per day as a nutritional supplement to the sludge treatment tank 51 so that its concentration within the sludge treatment tank 51 immediately after its addition became 1 mg/L. As a result, the sludge divertment rate of BOD contained in the water to be treated was 0.08 kg-MLSS/kg-BOD as BOD. Also, the concentration of minute organisms within the sludge treatment tank 51 was more stable compared to that of example 1.

EXAMPLE 3

As an example 3, an experiment was conducted using the treatment device 14 shown in FIG. 4 on artificial wastewater as the water to be treated, the artificial wastewater was the same as used in example 1. The activated sludge tank 23 was a volume of 15 L and operated under conditions of pH 6.8, volume loading of BOD of 0.76 kg/m$^3$/day, and HRT of 20 hours. Also, the sludge treatment tank 51 was a volume of 3 L and operated under conditions of pH 5.0, HRT of 6 days, and SRT of 6 days. The sludge which was discharged from the activated sludge tank 23 was introduced to the sludge treatment tank 51 at a supply volume of 0.5 L/day. Also, the sludge within the sludge treatment tank was discharged at 0.5 L/day.

In the example 3, unlike the example 1 where the water to be treated was supplied from the bypass path 26, concentrated sludge the main of which was dispersed bacteria generated in the dispersed bacteria growing tank 24, was added to the sludge treatment tank 51 via a third connecting tube 29. That is, the dispersed bacteria was generated by adding the water to be treated which was diverted by the bypass path 28 as substrates to the dispersed bacteria growing tank 24, and the concentrated sludge was added to the sludge treatment tank 51 at a supply volume of 17.5 mg-COD/day, the concentrated sludge was obtained by concentrating sludge held in the dispersed bacteria growing tank 24 and made up mainly of the dispersed bacteria. Further, lecithin was added once per day as a nutritional supplement to the sludge treatment tank 51 so that its concentration within the sludge treatment tank 51 immediately after its addition became 1 mg/L.

When the water to be treated was treated under the above-mentioned conditions for one month, the sludge divertment rate of BOD which was contained in the water to be treated was 0.16 kg-MLSS/kg-BOD.

EXAMPLE 4

As an example 4, an experiment was conducted using the treatment device 12 shown in FIG. 2 on artificial wastewater as the water to be treated, the artificial wastewater was the same as used in the example 1. The activated sludge tank 22 was a volume of 15 L and operated under conditions of pH 6.8, volume loading of BOD of 0.76 kg/m$^3$/day, and HRT of 20 hours. Also, the sludge treatment tank 51 was a volume of 3 L and operated under conditions of pH 5.0, HRT of 6 days, and SRT of 6 days. The sludge which was discharged from the activated sludge tank 22 was introduced to the sludge treatment tank 51 at a supply volume of 0.5 L/day. Also, the sludge within the sludge treatment tank was discharged at 0.5 L/day.

Similar to the example 1, a part of the water to be treated was bypassed via the bypass path 26 and was added as substrates in the example 4. Further, lecithin was added once per day as a nutritional supplement to the sludge treatment tank 51 so that its concentration within the sludge treatment tank 51 immediately after its addition became 1 mg/L. When the water to be treated was treated under the above-mentioned conditions, the sludge divertment rate of BOD which was contained in the water to be treated was 0.25 kg-MLSS/kg-BOD as BOD.

EXAMPLE 5

As an example 5, an experiment was conducted using the treatment device 13 shown in FIG. 3 on artificial wastewater as the water to be treated, the artificial wastewater was the same as used in the example 1. The volumes and operating conditions of the first activated sludge tank 21, the second activated sludge tank 31, and the sludge treatment tank 51 were the same as those of the example 1. However, not the water to be treated but the sludge held in the first activated sludge tank 21 was used as substrates to be added to the sludge treatment tank 51 in the example 5, and it was concentrated and added to the sludge treatment tank 51 via the divergence path 27 at a supply amount of 10.5 mg/day as COD concentration.

When the water to be treated was treated under the above-mentioned conditions, the sludge divertment rate of BOD which was contained in the water to be treated was 0.10 kg-MLSS/kg-BOD as BOD.

EXAMPLE 6

In addition to the construction and conditions of the example 5, lecithin was added once per day as a nutritional supplement to the sludge treatment tank 51 so that its concentration within the sludge treatment tank 51 immediately after its addition became 1 mg/L in an example 6. The other conditions were the same as the example 5, the sludge divertment rate of BOD which was contained in the water to be treated was 0.15 g-MLSS/kg-BOD as BOD. Also, the concentration of minute organisms within the sludge treatment tank 51 was more stable compared to that of example 5.

COMPARATIVE EXAMPLE 1

The artificial waste water which was the same as used in the example 1 was introduced to an activated sludge tank of 15 L as water to be treated and was treated under conditions of pH 6.8, volume loading of BOD of 0.76 kg/m$^3$/day, and HRT of 20 hours for one month. The sedimentation tank 41 which was the same as used in the example 3 was arranged after the activated sludge tank, and the quality of the treated water obtained by being solid liquid separation using the sedimentation tank was good. However, the sludge divertment rate of BOD which was included in the water to be treated was 0.40 kg-MLSS/kg-BOD as BOD.

As stated above, with the examples 1 to 6, it was possible to decrease the amount of the excess sludge by half or less compared to the comparative example 1 which was the example of a standard activated sludge method. In addition, a decrease of the minute organisms in the sludge treatment tank could be prevented in all the examples, and they allowed for a stable reduction of the sludge. Furthermore, the quality of the treated water which was obtained from sedimentation basin 41 in each example was good, and the treatment efficiencies were high.

The present invention can be used for the biological treatment of organic waste water such as sewage.

The invention claimed is:

1. A biological treatment method of organic wastewater for biologically treating organic wastewater which includes organic substances and is introduced to a biological treatment tank and separating effluent discharged from said biological treatment tank into sludge and treated water comprising:
   a biological treatment step for converting said organic substances in said organic wastewater as substrates into bacteria in said biological treatment tank;
   a sludge reduction step for reducing sludge by introducing generated sludge which includes said bacteria into a sludge treatment tank to be consumed by minute organisms; and
   an operation for adding substrates to be assimilated by said bacteria and/or dispersed bacteria generated by using said organic substances as substrates to said sludge treatment tank of said reduction step.

2. The biological treatment method of organic wastewater according to claim 1, wherein said biological treatment step includes
   a first biological treatment step wherein organic wastewater including organic substances is introduced to a first biological treatment tank and biologically treated for generating dispersed bacteria by using said organic substances as substrates, and
   a second biological treatment step wherein effluent which is discharged from said first biological treatment step and includes said dispersed bacteria is introduced to a second biological treatment tank for making said minute organisms consume said dispersed bacteria and generating bacteria by using a part of said organic substances which remain without being treated in said first biological treatment step;
   said sludge reduction step is a process for reducing sludge by introducing generated sludge generated in said second biological treatment step into said sludge treatment tank to be consumed by said minute organisms; and
   wherein substrates to be assimilated by dispersed bacteria and/or dispersed bacteria generated in said first biological treatment tank are added to said sludge treatment tank.

3. The biological treatment method of organic wastewater according to claim 1, further comprising
   a dispersed bacteria generating step for generating dispersed bacteria by introducing a part of organic wastewater to be introduced to said biological treatment step and/or substrates to be assimilated by bacteria to a dispersed bacteria growing tank which is arranged parallel to said biological treatment tank;
   wherein said sludge reduction step is a process for reducing sludge by introducing a part or all of generated sludge generated in said biological treatment step into said sludge treatment tank to be consumed by said minute organisms; and
   wherein dispersed bacteria generated in said dispersed bacteria growing tank are added to said sludge treatment tank.

4. The biological treatment method of organic wastewater according to claim 1, wherein a part of said organic wastewater is made to bypass said biological treatment step and is introduced to said sludge treatment tank of said sludge reduction step.

5. The biological treatment method of organic wastewater according to claim 1, wherein a part of said organic wastewater is made to bypass said biological treatment step and is introduced to said sludge treatment tank of said sludge reduction step.

6. The biological treatment method of organic wastewater according to claim 1, wherein a nutritional supplement for said minute organisms is further added to said sludge treatment tank of said sludge reduction step.

7. The biological treatment method of organic wastewater according to claim 2, wherein a nutritional supplement for said minute organisms is further added to said sludge treatment tank of said sludge reduction step.

8. The biological treatment method of organic wastewater according to claim 3, wherein a nutritional supplement for said minute organisms is further added to said sludge treatment tank of said sludge reduction step.

9. The biological treatment method of organic wastewater according to claim 4, wherein a nutritional supplement for said minute organisms is further added to said sludge treatment tank of said sludge reduction step.

10. The biological treatment method of organic wastewater according to claim 5, wherein a nutritional supplement for said minute organisms is further added to said sludge treatment tank of said sludge reduction step.

11. The biological treatment method of organic wastewater according to claim 1, wherein a mean retention time of sludge which is held within said sludge treatment tank of said sludge reduction step is set to be between 2 to 30 days.

12. The biological treatment method of organic wastewater according to claim 2, wherein a mean retention time of sludge which is held within said sludge treatment tank of said sludge reduction step is set to be between 2 to 30 days.

13. The biological treatment method of organic wastewater according to claim 3, wherein a mean retention time of sludge which is held within said sludge treatment tank of said sludge reduction step is set to be between 2 to 30 days.

14. The biological treatment method of organic wastewater according to claim 4, wherein a mean retention time of sludge which is held within said sludge treatment tank of said sludge reduction step is set to be between 2 to 30 days.

15. The biological treatment method of organic wastewater according to claim 5, wherein a mean retention time of sludge which is held within said sludge treatment tank of said sludge reduction step is set to be between 2 to 30 days.

16. The biological treatment method of organic wastewater according to claim 6, wherein a mean retention time of sludge which is held within said sludge treatment tank of said sludge reduction step is set to be between 2 to 30 days.

17. The biological treatment method of organic wastewater according to claim 7, wherein a mean retention time of sludge which is held within said sludge treatment tank of said sludge reduction step is set to be between 2 to 30 days.

18. The biological treatment method of organic wastewater according to claim 8, wherein a mean retention time of sludge which is held within said sludge treatment tank of said sludge reduction step is set to be between 2 to 30 days.

19. The biological treatment method of organic wastewater according to claim 9, wherein a mean retention time of sludge which is held within said sludge treatment tank of said sludge reduction step is set to be between 2 to 30 days.

20. A biological treatment device of organic wastewater comprising:
- a biological treatment tank to which organic wastewater including organic substances is introduced and which biologically treats said organic wastewater to generate bacteria using said organic substances as substrates;
- a solid liquid separating device which separates effluent discharged from said biological treatment tank into treated water and sludge;
- a sludge treatment tank which holds minute organisms and into which said sludge is introduced to be consumed by said minute organisms; and
- an adding device for adding substrates to be assimilated by said bacteria and/or dispersed bacteria generated by using said organic substances as substrates to said sludge treatment tank.

\* \* \* \* \*